United States Patent
Oya et al.

(10) Patent No.: US 11,137,747 B2
(45) Date of Patent: Oct. 5, 2021

(54) CONTROL SYSTEM FOR A PRODUCTION LINE DRIVE UNIT

(71) Applicant: OMRON Corporation, Kyoto (JP)

(72) Inventors: Taku Oya, Kyoto (JP); Kyohei Asai, Nara (JP); Go Aoki, Souraku-gun (JP)

(73) Assignee: OMRON Corporation, Kyoto (JP)

( * ) Notice: Subject to any disclaimer, the term of this patent is extended or adjusted under 35 U.S.C. 154(b) by 301 days.

(21) Appl. No.: 15/755,124

(22) PCT Filed: Aug. 16, 2017

(86) PCT No.: PCT/JP2017/029428
§ 371 (c)(1),
(2) Date: Feb. 26, 2018

(87) PCT Pub. No.: WO2018/047592
PCT Pub. Date: Mar. 15, 2018

(65) Prior Publication Data
US 2020/0225647 A1    Jul. 16, 2020

(30) Foreign Application Priority Data

Sep. 7, 2016 (JP) .............................. JP2016-174725

(51) Int. Cl.
*G05B 19/418* (2006.01)
*G06Q 10/06* (2012.01)
(52) U.S. Cl.
CPC ... *G05B 19/41865* (2013.01); *G05B 19/4183* (2013.01); *G05B 19/41875* (2013.01);
(Continued)

(58) Field of Classification Search
None
See application file for complete search history.

(56) References Cited

U.S. PATENT DOCUMENTS 6,522,952 B1    2/2003    Arai et al.
2003/0135303 A1    7/2003    Arai et al.
(Continued)

FOREIGN PATENT DOCUMENTS

CN    102229147 A    11/2011
JP    2000-343469 A    12/2000
(Continued)

OTHER PUBLICATIONS

Office Action dated Jul. 21, 2020 in a counterpart Chinese patent application.
(Continued)

*Primary Examiner* — Ryan A Jarrett
(74) *Attorney, Agent, or Firm* — Metrolex IP Law Group, PLLC

(57) ABSTRACT

A control device that controls a drive unit included by a production line includes: an obtaining unit that obtains physical information indicating a variation with time of a posture of a worker at work; a storage for storing physical information of the worker obtained when the worker works in a stable posture; a detection unit that detects a difference between a magnitude of the variation with time indicated by the physical information obtained and a magnitude of a variation with time indicated by the physical information stored in the storage; and a determination unit that determines from the detected difference whether to change an amount of controlling the drive unit.

9 Claims, 6 Drawing Sheets

(52) U.S. Cl.
CPC .............. *G06Q 10/063114* (2013.01); *G05B 2219/40202* (2013.01); *G05B 2219/40203* (2013.01)

(56) References Cited

U.S. PATENT DOCUMENTS

| | | |
|---|---|---|
| 2009/0212478 A1 | 8/2009 | Murayama |
| 2010/0087955 A1 | 4/2010 | Tsusaka et al. |
| 2011/0208558 A1* | 8/2011 | Wakita ................... G06Q 10/06 705/7.15 |
| 2012/0279285 A1 | 11/2012 | Kato et al. |
| 2015/0352719 A1 | 12/2015 | Nakazato et al. |

FOREIGN PATENT DOCUMENTS

| | | |
|---|---|---|
| JP | 2000-354943 A | 12/2000 |
| JP | 2011-156641 A | 8/2011 |
| JP | 5048886 B2 | 10/2012 |
| JP | 2014-199595 A | 10/2014 |
| JP | 2015-230621 A | 12/2015 |
| KR | 10-2016-0066259 A | 6/2016 |

OTHER PUBLICATIONS

Office action dated Jan. 29, 2019, in a counterpart Korean patent application.
EESR dated Mar. 31, 2020 in a counterpart European patent application.
English translation of the International Search Report (ISR) of PCT/JP2017/029428 dated Sep. 12, 2017.
English translation of the Written Opinion (WO) of PCT/JP2017/029428 dated Sep. 12, 2017.

* cited by examiner (AT WORK IN STABLE CONDITION)

(WHEN EXHAUSTED, IN BAD PHYSICAL CONDITION, ETC.)

CONTROL SYSTEM FOR A PRODUCTION LINE DRIVE UNIT

TECHNICAL FIELD

The present invention relates to a control device, a system, a control method and a program, and particularly to a control device, a system, a control method, and a program that control a drive unit comprised by a production line.

BACKGROUND ART

On factory production lines, workers may do his/her work in cooperation with machines such as robots. In such a case, it is desired to control the machine such as a robot in accordance with the state of the load of the work on the worker.

PTD 1 (Japanese Patent Laying-Open No. 2011-156641) discloses a system in which for an operation done by a person and a machine in cooperation, such as the person and the machine working together to assemble an object, a sensor, such as motion capture, is attached to the person to control the machine to operate in accordance with the person's movement. Specifically, PTD 1 discloses comparing reference data of a working movement previously obtained from a working skilled worker and registered with data of a working movement of a worker measured when a production line is in operation, and using a result of the comparison to correct the position of an industrial robot.

CITATION LIST

Patent Document

PTD 1: Japanese Patent Laying-Open No. 2011-156641

SUMMARY OF INVENTION

Technical Problem

When a worker works on a production line in cooperation with a machine such as a robot, it is desired to maintain productivity within a range in which the worker is not overloaded. In PTD 1, however, in order to control the robot, the data of the working movement of the worker is compared with the reference data obtained from the working movement of the skilled worker. Accordingly, the worker on the production line will be directed to move to the working movement of the skilled worker, and may physically be overloaded. As a result, the worker tends to be easily exhausted resulting in poor productivity and the like.

Accordingly, it is desired to control a drive unit of a production line in accordance with a load on a worker.

Solution to Problem

In one aspect of the present disclosure, a control device that controls a drive unit comprised by a production line comprises: an obtaining unit that obtains physical information of a worker indicating a variation with time of a posture of the worker at work; a storage for storing physical information of the worker obtained when the worker works in a stable posture; a detection unit that detects a difference between a magnitude of the variation with time indicated by the physical information obtained and a magnitude of a variation with time indicated by the physical information stored in the storage; and a determination unit that determines from the detected difference whether to change an amount of controlling the drive unit.

Preferably, the physical information includes information of the worker indicating a variation with time of an amount of movement of the worker at work.

Preferably, the determination unit includes an estimation unit that determines from the difference a degree of a load on the worker, and, from a result of a determination made by the estimation unit, determines whether to change the amount of controlling the drive unit.

Preferably, when the obtaining unit has obtained the physical information, the detection unit detects a difference between a feature value of the obtained physical information and a feature value of the physical information stored in the storage.

Preferably, the physical information further includes biological information of the worker at least including bodily temperature.

Preferably, the control device further comprises an accumulation unit that accumulates in the storage the physical information of the worker obtained when the worker works in a stable posture.

In another aspect of the present disclosure, a system comprises: a drive unit comprised by a production line; a sensor comprised by the production line and sensing a posture of a worker at work; and a control device that controls the drive unit, the control device including an obtaining unit that obtains physical information from the sensor indicating a variation with time of the posture, a storage for storing physical information of the worker obtained when the worker works in a stable posture, a detection unit that detects a difference between a magnitude of the variation with time indicated by the physical information obtained and a magnitude of a variation with time indicated by the physical information stored in the storage, and a determination unit that determines from the detected difference whether to change an amount of controlling the drive unit.

In still another aspect of the present disclosure, a method comprises: obtaining physical information of a worker indicating a variation with time of a posture of the worker at work; detecting a difference between a magnitude of the variation with time indicated by the physical information obtained and a magnitude of a variation with time of a posture of the worker indicated by physical information of the worker obtained when the worker works in a stable posture; and determining from the detected difference whether to change an amount of controlling the drive unit.

In still another aspect of the present disclosure, a program is a program for causing a computer to perform a method for controlling a drive unit comprised by a production line, the computer including a storage for storing physical information of a worker indicating a variation with time of a posture of the worker at work in a stable posture, the method comprising: obtaining physical information of the worker indicating a variation with time of a posture of the worker at work; detecting a difference between a magnitude of the variation with time indicated by the physical information obtained and a magnitude of the variation with time indicated by the physical information stored in the storage; and determining from the detected difference whether to change an amount of controlling the drive unit.

Advantageous Effects of Invention

According to this disclosure, physical information of a worker obtained when the worker works in a stable posture is stored in a storage. From a difference between a magnitude of a variation with time that is indicated by the worker's physical information obtained when the worker works on a production line and a magnitude of a variation with time that is indicated by physical information obtained in a case of working in the stable posture and stored in the storage, whether to change an amount of controlling a drive unit comprised by the production line is determined. This difference can vary with the working load on the worker. The drive unit of the production line can thus be controlled depending on the load on the worker.

DESCRIPTION OF EMBODIMENTS

The present invention will now be described in embodiments hereinafter in detail with reference to the drawings. In the figures, identical or corresponding components are identically denoted and will not be described repeatedly.

First Embodiment (Configuration of System)

Figure 1:
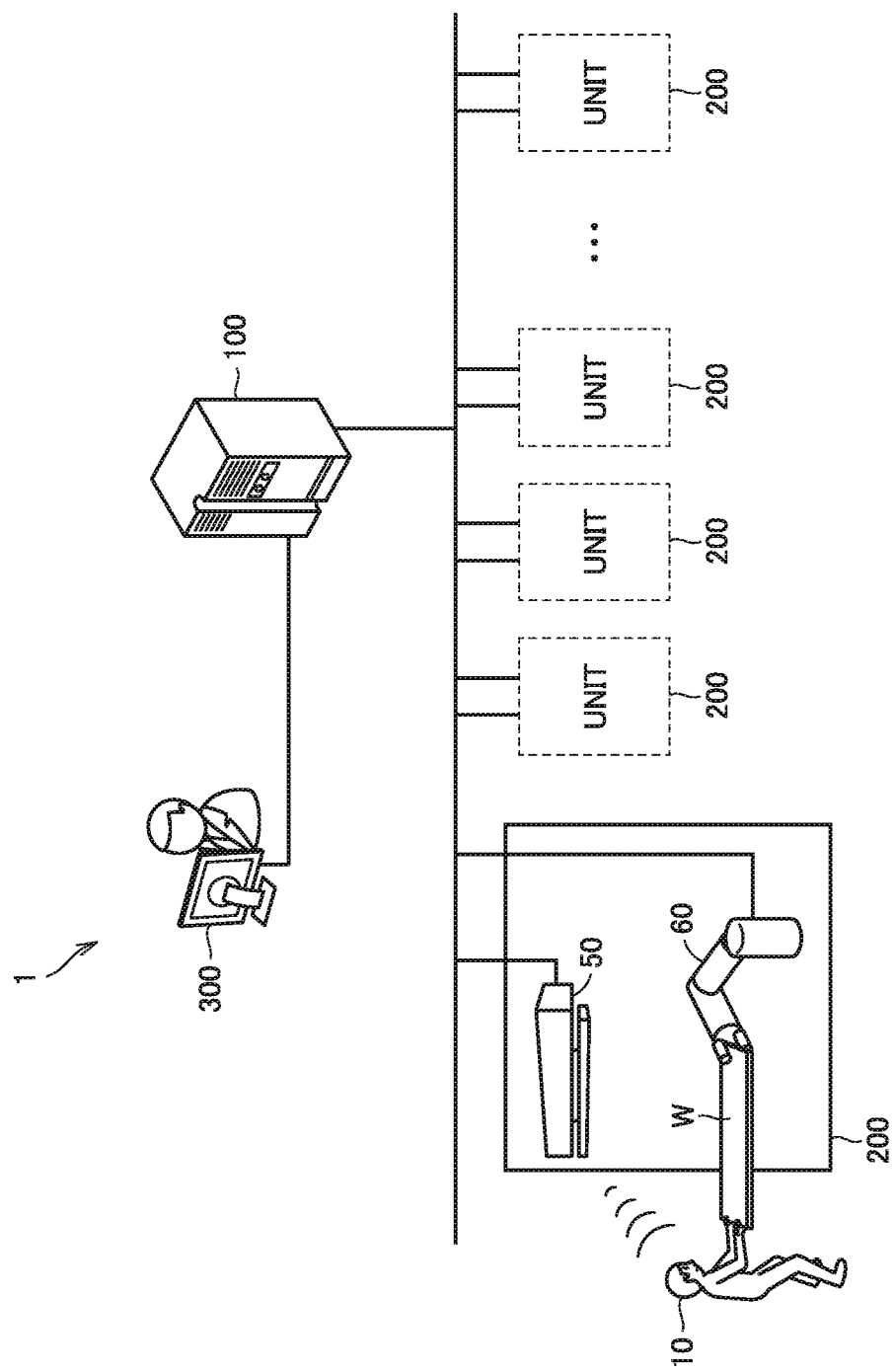
FIG. 1 schematically shows a general configuration of a system 1 according to a first embodiment.

FIG. 1 schematically shows a general configuration of a system 1 according to a first embodiment. A production line such as in a factory comprises one or more units 200 used for a worker's operation, a control computer 100 such as a PLC (Programmable Logic Controller), and a management computer 300 operated by a manager. These components communicate with each other via wire or wirelessly.

Unit 200 includes an industrial robot 60 (hereinafter, simply referred to as robot 60) that works in cooperation with a worker 10, and a sensor 50 that senses an amount of movement of a human body contactlessly. In FIG. 1, worker 10 works in cooperation with robot 60 to transport a workpiece W for example.

Sensor 50 includes a distance image sensor as a hardware circuit, and a microcomputer that executes a software program that estimates a posture of a human body from an output of the distance image sensor. The distance image sensor irradiates a target (i.e., the human body) with infrared radiation to obtain an infrared pattern which is in turn analyzed to obtain a distance image. The microcomputer matches the distance image against a previously registered pattern image and, based on a result of the matching, detects in the distance image a posture of the human body, that is, a position (or a coordinate value) of each part thereof such as head, shoulder, arm, waist, leg, etc. From a distance image obtained in time series is detected a time-series variation (a variation with time) of the posture of the human body (or the position of each part). Thus, sensor 50 transmits to control computer 100 physical information of a worker located within the infrared irradiation range indicating a variation with time of the posture of the worker at work.

The method of measuring an amount of movement of a body is not limited to the method of measurement from a distance image, such as sensor 50, and may for example be a method of sensing a movement through positional information of an optical marker attached to the body of the worker or a method of sensing a movement of a magnetic sensor attached to the body. Furthermore, while in FIG. 1 sensor 50 is provided for each unit 200, a single sensor 50 may be shared by a plurality of units 200.

(Configuration of Control Computer 100)

Figure 2:
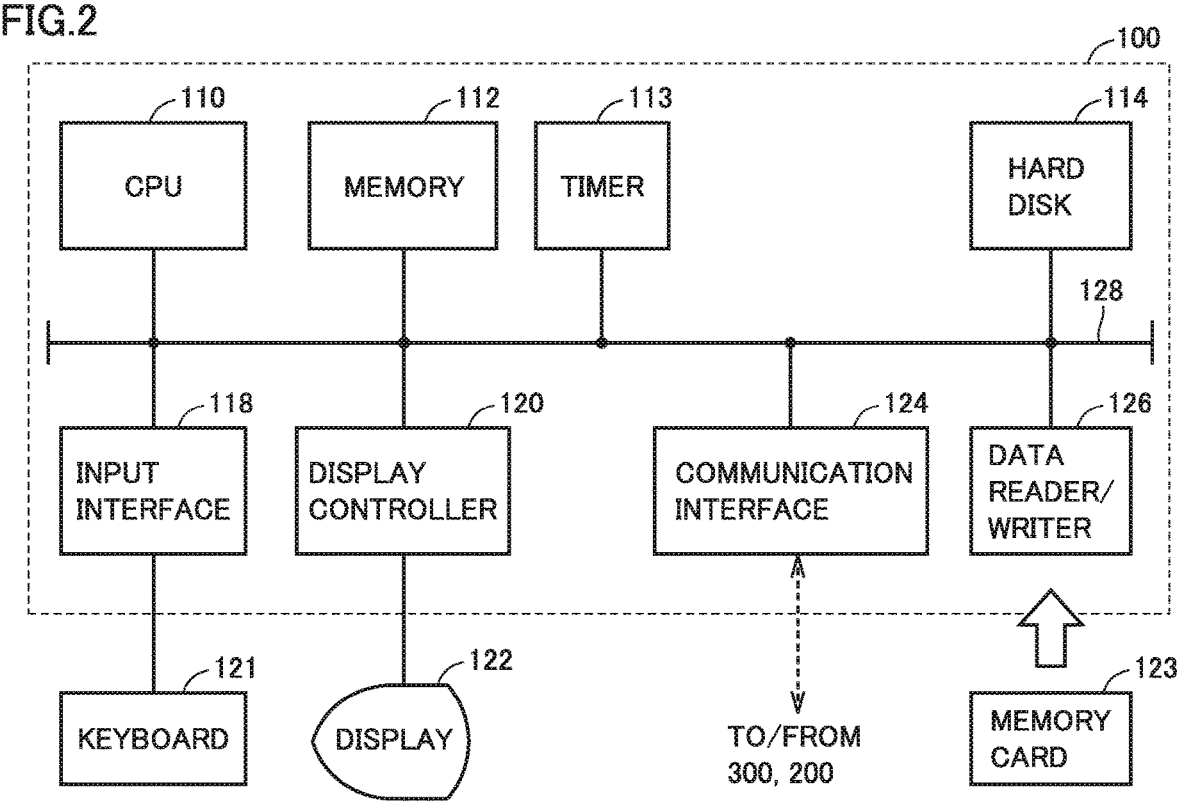
FIG. 2 schematically shows a hardware configuration of a control computer 100 shown in FIG. 1.

FIG. 2 schematically shows a hardware configuration of control computer 100 shown in FIG. 1. Referring to FIG. 2, control computer 100 includes a central processing unit (CPU) 110 serving as an operation processing unit, a memory 112 and a hard disk 114 serving as a storage, a timer 113 counting time and outputting data of counted time to CPU 110, an input interface 118, a display controller 120 controlling a display 122, a communication interface 124, and a data reader/writer 126. These components are connected to each other via a bus 128 so that they can communicate data with each other.

CPU 110 performs various operations by executing a program (a code) stored in hard disk 114. Memory 112 is typically a volatile storage device such as a dynamic random access memory (DRAM), and stores program data read from hard disk 114, and in addition thereto physical information received from sensor 50 and work data etc.

Input interface 118 mediates data transmission between CPU 110 and an input device such as a keyboard 121, a mouse (not shown), a touch panel (not shown), etc. In other words, input interface 118 receives an operation instruction issued by a user operating the input device.

Communication interface 124 mediates data transmission between unit 200 (sensor 50 and robot 60) and management computer 300. Data reader/writer 126 mediates data transmission between CPU 110 and a memory card 123 serving as a recording medium.

(Configuration of Robot 60)

Figure 3:
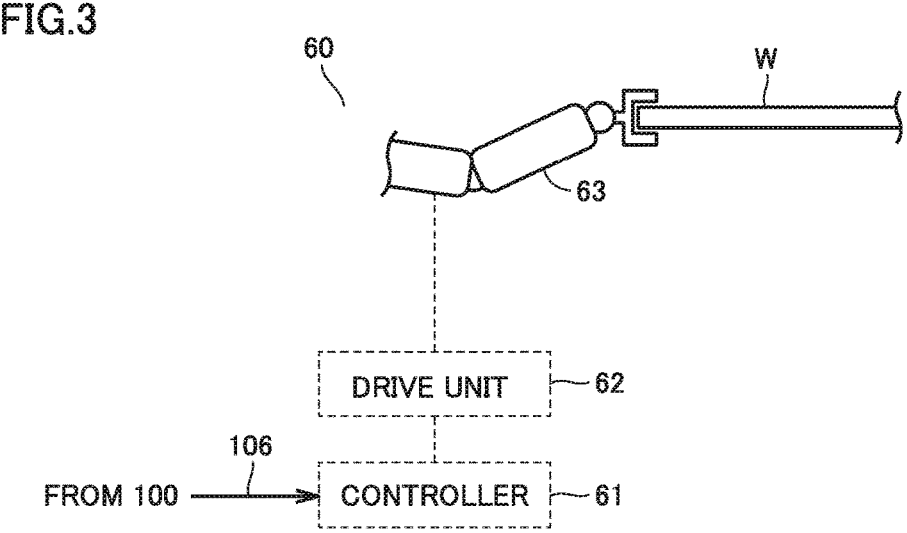
FIG. 3 schematically shows a configuration of a robot 60 shown in FIG. 1.

FIG. 3 schematically shows a configuration of robot 60 shown in FIG. 1. Robot 60 includes an arm 63 that pivots as desired to hold and transport workpiece W, a drive unit 62 for causing arm 63 to pivot to transport workpiece W, and a controller 61 to control drive unit 62. The work's content is not limited to transporting workpiece W, and may be attaching workpiece W to a main body when workpiece W is a part.

Drive unit 62 is, for example, a servo motor. Robot 60 has arm 63 connected to drive unit 62 (more specifically, a rotation shaft of the servo motor). An encoder (not shown) is attached to drive unit 62. The encoder detects a physical quantity indicating a state of an operation of drive unit 62 and generates a feedback signal indicating the detected physical quantity, and also outputs the feedback signal to controller 61 corresponding to a servo driver. The feedback signal for example includes positional information of a rotational position (or an angle) of the rotation shaft of the motor of drive unit 62, information of a rotational speed of the rotation shaft, etc. That is, in this embodiment, a rotational position of the rotation shaft of the motor and a rotational speed of the rotation shaft of the motor are detected as a physical quantity representing a state of an operation of drive unit 62 (or the servo motor). In addition to or in place of the rotational position and the rotational speed, acceleration, an amount of variation (or an amount of movement), a direction of variation (or a direction of movement), and the like may be detected.

Controller 61 receives a command signal from control computer 100 and also receives the feedback signal output from the encoder. Controller 61 drives drive unit 62 in response to the command signal received from control computer 100 and the feedback signal received from the encoder.

Based on the command signal received from control computer 100, controller 61 sets a command value for an operation of drive unit 62. Furthermore, controller 61 drives drive unit 62 to operate to follow the command value. Specifically, controller 61 controls a drive current for drive unit 62 (or the servo motor) in accordance with the command value.

Thus, when robot 60 cooperates with worker 10 to transport workpiece W held by arm 63, an amount of controlling arm 63, such as a rotational angle, a rotational direction, and a rotational speed for causing the arm to pivot, is variably controlled via controller 61 and drive unit 62 remotely by the command signal received from control computer 100.

(Example of Physical Information)

Figure 4:
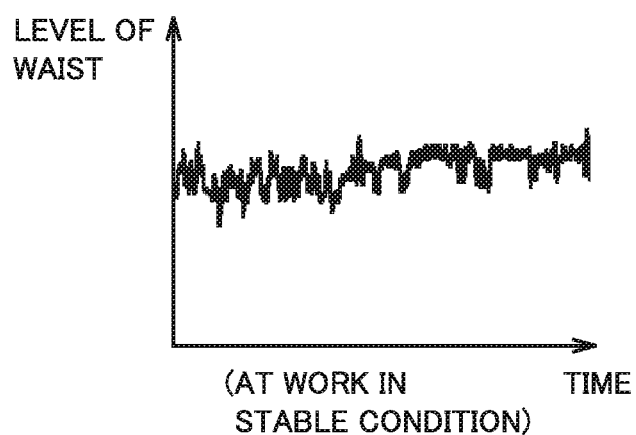
FIG. 4 exemplarily represents physical information according to the first embodiment.
Figure 5:
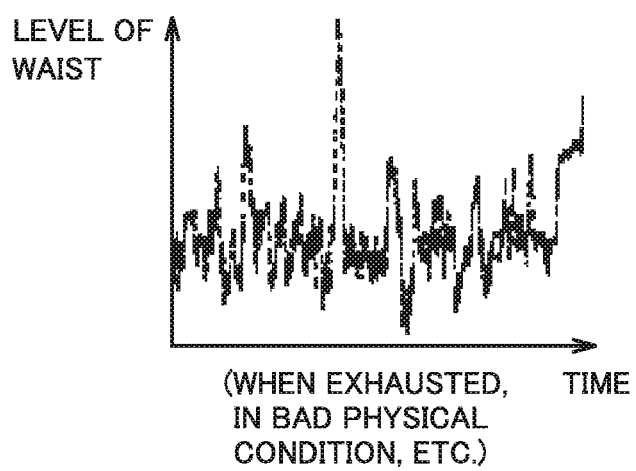
FIG. 5 exemplarily represents physical information according to the first embodiment.

FIGS. 4 and 5 exemplarily represent physical information according to the first embodiment. In the embodiment, as has been set forth above, sensor 50 senses physical information of worker 10 including a variation with time of an amount of movement of the body (or a posture) of worker 10. FIG. 4 graphically represents an example of physical information of worker 10 detected when the worker works to transport workpiece W in a good physical condition or a similar, physically stable condition for example (hereinafter also referred to as being at work in a stable condition or the like). FIG. 5 graphically represents an example of physical information of the same worker 10 detected when the worker works to transport workpiece W in a physically unstable condition (e.g., when the worker is exhausted or in a bad physical condition, etc.). These graphs show data obtained through an experiment conducted by the present inventors.

In FIGS. 4 and 5, the vertical axis represents the level of the waist of worker 10, and the horizontal axis represents time. When worker 10 works in a good physical condition, worker 10 can work to transport workpiece W in a stable posture. Accordingly, when worker 10 works in a stable condition as shown in FIG. 4, the level (or position) of the waist of worker 10 does not vary significantly with time and converges to a fixed range. On the other hand, when worker 10 does the same work of transporting workpiece W in a poor physical condition, worker 10 is overloaded and cannot maintain a stable posture. In such a case, as shown in FIG. 5, as time elapses, the waist's level (or position) significantly varies and never converges to a fixed range. Whether worker 10 is overloaded (or a degree (or magnitude) of a load) can be estimated from a magnitude of a variation with time of a posture indicated by physical information obtained at work.

While the present embodiment is described with variation of the posture of worker 10 as variation in level (or position) of the waist of the worker, the postural variation is not limited to the position of the waist or the worker. For example, the postural variation may be a variation in a relative positional relationship of different body parts (for example, a positional relationship indicated by a distance between the head and an arm).

(Functional Configuration of Control Computer 100)

Figure 6:
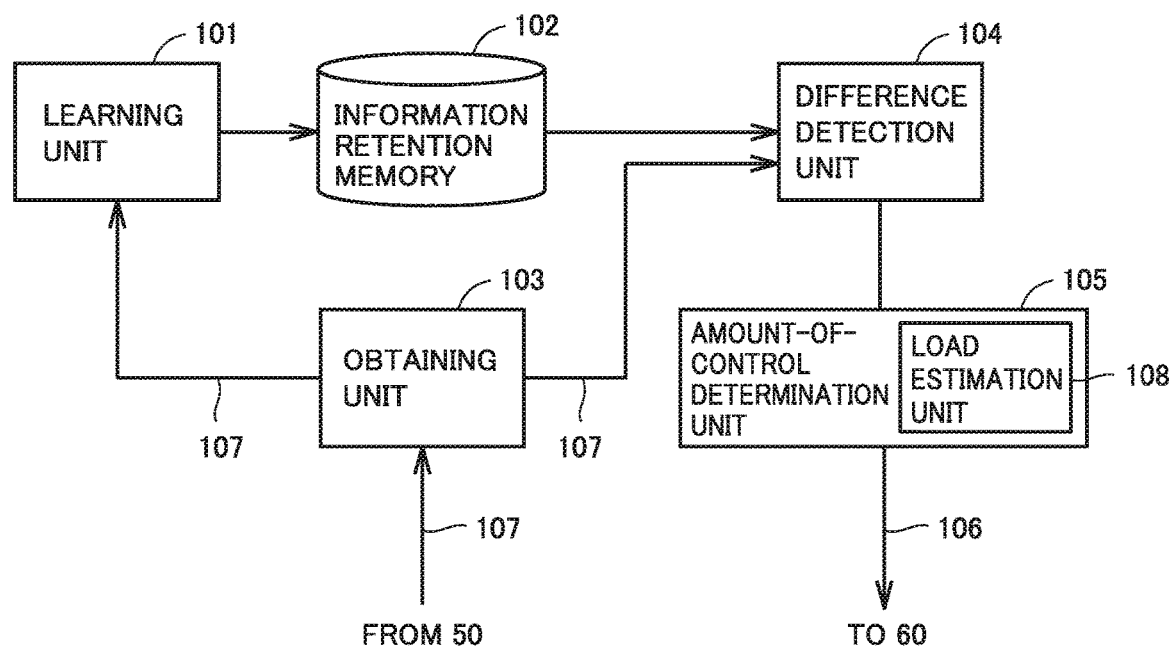
FIG. 6 schematically shows a configuration of a function of control computer 100 according to the first embodiment.

FIG. 6 schematically shows a configuration of a function of control computer 100 according to the first embodiment. FIG. 6 illustrates a function including a function which determines from the worker's physical information an amount of controlling drive unit 62. With reference to FIG. 6, control computer 100 includes a learning unit 101, an obtaining unit 103 obtaining physical information from sensor 50, a difference detection unit 104, and an amount-of-control determination unit 105. Furthermore, control computer 100 includes an information retention memory 102 corresponding to a storage, such as a hard disk 114.

Obtaining unit 103 controls communication interface 124 to obtain (or receive) physical information from sensor 50, and outputs the obtained physical information 107 to each unit.

When control computer 100 operates in a "learning mode," learning unit 101 receives physical information 107 from obtaining unit 103 and stores the received physical information 107 to information retention memory 102. Whenever learning unit 101 in the "learning mode" receives physical information 107 from obtaining unit 103, learning unit 101 accumulates the received physical information 107 in information retention memory 102. Thus, in the "learning mode," one or more pieces of physical information 107 is/are accumulated (or stored) in information retention memory 102. Learning unit 101 is an embodiment of an "accumulation unit" that accumulates physical information 107 in information retention memory 102.

When control computer 100 operates in the "operational mode," and physical information 107 is received from obtaining unit 103, difference detection unit 104 calculates (or detects) a difference between a magnitude of a variation with time of a posture indicated by the received physical information 107 and a magnitude of a variation with time indicated by physical information 107 obtained in the learning mode and read from information retention memory 102.

Amount-of-control determination unit 105 has a load estimation unit 108. In the "operational mode," load estimation unit 108 compares a difference detected by difference detection unit 104 with a threshold value TH to determine whether the worker experiences a degree of a load corresponding to an overloaded condition. If worker 10 is not in a good physical condition, the worker can be under an overloaded condition even when the worker does normal work, and even if the worker is in a good physical condition, working continuously for a long period of time and thus being exhausted can put the worker under an overloaded condition. Load estimation unit 108 compares the above-described difference with threshold value TH to determine whether the worker is under an overloaded condition. In the embodiment, a determination made by load estimation unit 108 corresponds to a determination as to whether to change an amount of controlling drive unit 62. If the worker is under an overloaded condition, amount-of-control determination unit 105 determines from the difference a changed amount of controlling drive unit 62. Amount-of-control determination unit 105 generates a command signal 106 indicating an amount of controlling the drive unit, and transmits the signal to controller 61 of robot 60 via communication interface 124.

The above difference may be detected from a feature value of a magnitude of a postural variation indicated by physical information 107. Specifically, CPU 110 detects as the feature value a representative value of a magnitude of a postural variation. The representative value includes for example a mean, a median, an integral, a variance, a mode, etc. of the level of the waist as sensed at a predetermined time. When the feature value is used, then, in the "operational mode," difference detection unit 104 may be adapted to calculate a difference between a feature value indicated by a plurality of pieces of physical information 107 stored in information retention memory 102 and a feature value (or representative value) of a plurality of pieces of physical information 107 received for a predetermined period of time via obtaining unit 103. Furthermore, information retention memory 102 stores the plurality of pieces of physical information 107 and a feature value corresponding thereto, or stores the feature value alone. When the feature value is alone stored, a capacity required by information retention memory 102 can be reduced.

Furthermore, the "learning mode" may be implemented: periodically; when worker 10 is changed; or when the type of workpiece W is changed. Accordingly, information retention memory 102 can store physical information 107 (or a feature value) periodically, for each worker 10, or for each type of workpiece W.

(Process Flowchart)

A process of the "learning mode" and "operational mode" described above will be described. Note that a similar process described below is performed for unit 200 shown in FIG. 1.

Figure 7:
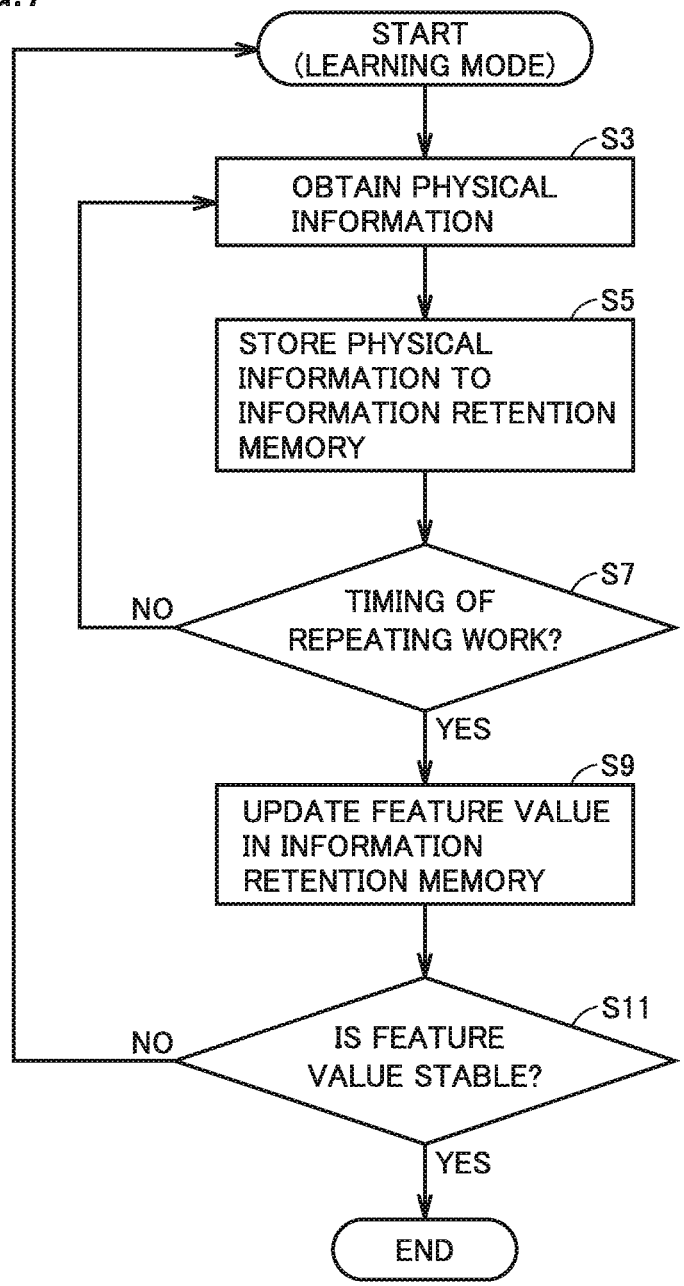
FIG. 7 shows a flowchart of a process of a "learning mode" according to the first embodiment.
Figure 8:
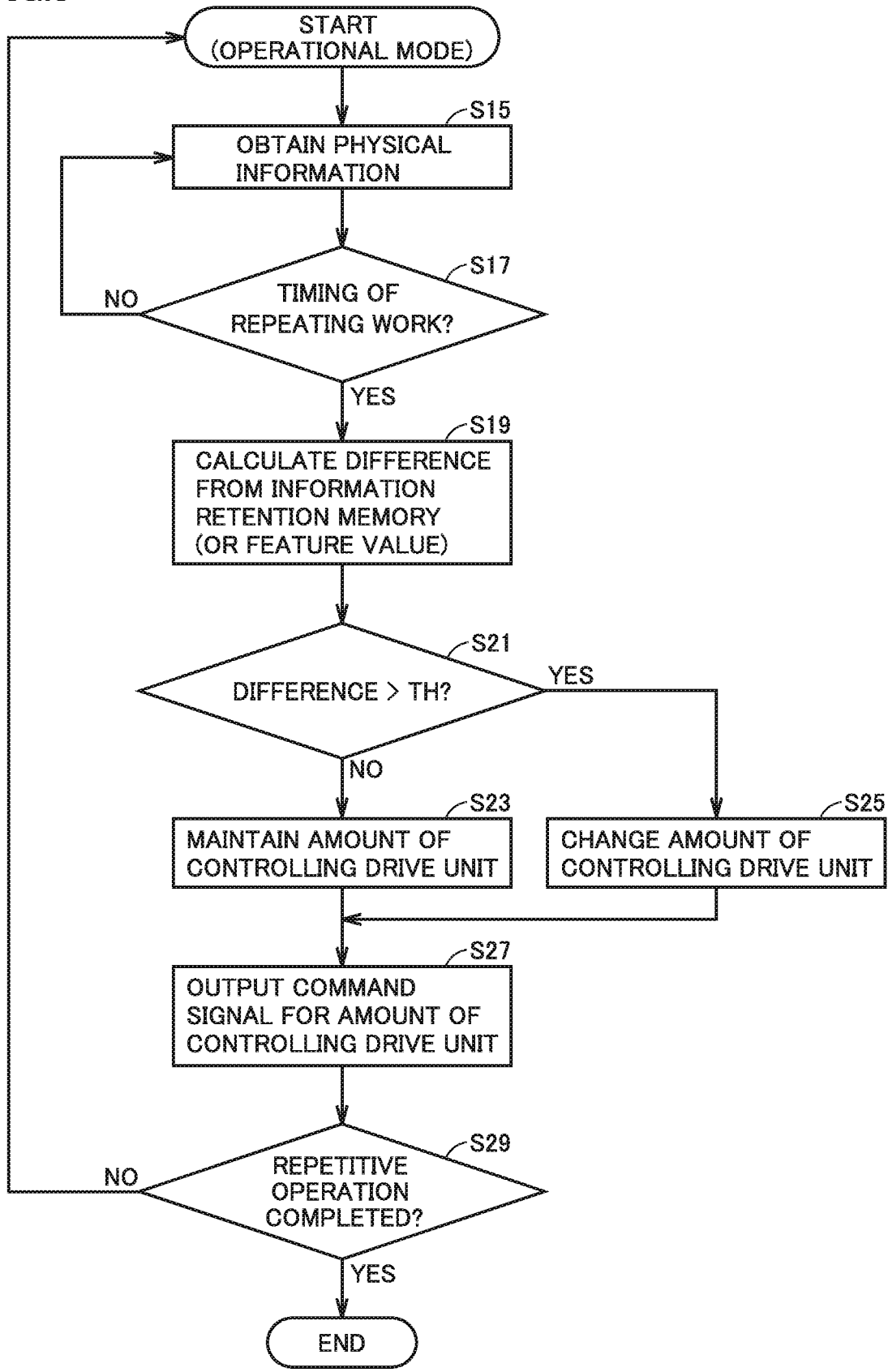
FIG. 8 shows a flowchart of a process of an "operational mode" according to the first embodiment.

FIG. 7 shows a flowchart of a process of the "learning mode" according to the first embodiment. FIG. 8 shows a flowchart of a process of the "operational mode" according to the first embodiment. The processes of these flowcharts are stored as a program in control computer 100 at a storage (such as memory 112, hard disk 114, memory card 123, etc.). CPU 110 reads the program from the storage and executes the program. Note that herein, on the production line, when worker 10 working with robot 60 ends an operation of transporting workpiece W, worker 10 similarly repeats a next operation of transporting workpiece W. The production line is equipped with a sensor (not shown) sensing an end of a transporting operation of each time. For example, the sensor is a proximity switch which senses that workpiece W has moved to a prescribed position of the production line. Control computer 100 receives a detection signal from the sensor and processes the signal as a timing signal indicating a timing of repeating each transporting operation.

Note that control computer 100 that implements the "learning mode" may be the same as or different from control computer 100 that implements the "operational mode." If the former differs from the latter, control computer 100 that implements the "operational mode" can obtain information to be stored in information retention memory 102 by receiving the information from another control computer 100 via communication interface 124 or by reading the information from memory card 123.

(Process of "Learning Mode")

With reference to FIG. 7, in the "learning mode," obtaining unit 103 initially obtains from sensor 50 physical information 107 of worker 10 at work in a stable condition (step S3), and stores the information to information retention memory 102 (step S5).

CPU 110 determines whether the above-described timing signal is input (step S7). While CPU 110 determines that the timing signal is not input (NO in step S7), CPU 110 returns to step S3 and executes the subsequent process.

When CPU 110 determines that the timing signal is input (YES in step S7), CPU 110 obtains (or calculates) the above-described feature value from one or more pieces of physical information 107 stored in information retention memory 102, and stores the obtained feature value to information retention memory 102 (Step S9). As the feature value, an average value is calculated, for example. When doing so, an immediately previously obtained (or calculated) and stored feature value may be overwritten and thus updated.

CPU 110 determines whether the feature value obtained in step S9 is stable (step S11). For example, CPU 110 so determines when the feature value has converged to a threshold value.

When CPU 110 determines that a stable feature value is not obtained (NO in step S11), CPU 110 repeats the process of the "learning mode" from the beginning, and when CPU 110 has determined that a stable feature value is obtained (YES in step S11), CPU 110 ends the process of the "learning mode."

In the above learning mode, a feature value can be obtained and stored to information retention memory 102 for each repeated operation.

(Process of "Operational Mode")

With reference to FIG. 8, in the "operational mode," initially, obtaining unit 103 obtains physical information 107 of worker 10 from sensor 50 (step S15). CPU 110 determines whether the above-described timing signal is input (Step S17). While CPU 110 determines that the timing signal is not input (NO in step S17), CPU 110 returns to step S15 and executes the subsequent process.

When CPU 110 determines that the timing signal is input (YES in step S17), difference detection unit 104 detects (or calculates) a difference between a magnitude of a postural variation indicated by one or more pieces of physical information 107 stored in information retention memory 102 and a magnitude of a postural variation indicated by physical information 107 obtained in step S15 (Step S19). This process may be done to detect (or calculate) a difference between a feature value (e.g., an average value) stored in information retention memory 102 and a feature value of physical information 107 obtained in step S15 (e.g., an average value of postural variation in magnitude).

Load estimation unit 108 compares the difference detected in step S19 with threshold value TH to determine whether the difference is larger than threshold value TH (step S21). Threshold value TH is a value for determining whether worker 10 is overloaded, and threshold value TH is obtained for each worker 10 through an experiment. Load estimation unit 108 determines that when the difference is equal to or less than threshold value TH the difference corresponds to a normal load rather than an overload, and load estimation unit 108 determines that when the difference is larger than threshold value TH the difference corresponds to an overload.

When load estimation unit 108 determines that the difference is equal to or less than threshold value TH (NO in step S21), amount-of-control determination unit 105 follows the result of the determination and accordingly generates a command signal 106 to exactly maintain (i.e., avoid changing) an amount of controlling drive unit 62 (Step S23) and outputs the signal via communication interface 124 (step S27). When load estimation unit 108 determines that the difference is larger than threshold value TH (YES in step S21), amount-of-control determination unit 105 follows the result of the determination and accordingly performs a process for changing an amount of controlling drive unit 62 (Step S25) and generates and outputs via communication interface 124 command signal 106 indicating the changed amount of controlling drive unit 62 (step S27). Specifically, amount-of-control determination unit 105 calculates through a predetermined operation an amount of controlling drive unit 62 in a direction to reduce the difference. Note that obtaining the amount of controlling drive unit 62 is not limited to a method of calculating the same. For example, a table in which a plurality of sets each of a difference and an amount of controlling drive unit 62 are registered may be stored, and, based on a difference detected in step S19, the table may be searched and a corresponding amount of controlling drive unit 62 may be read from the table.

CPU 110 determines in response to a signal received from the production line whether to end a repetitive operation (step S29). When CPU 110 determines that the repetitive operation is not to be ended (NO in step S29), CPU 110 returns to step S15 and performs a subsequent process. When CPU 110 determines that the repetitive operation is to be ended (YES in step S29), CPU 110 ends the operational mode.

In the above operational mode, whether an amount of controlling drive unit 62 should be changed is determined for each repeated operation, and when the amount should be changed, it can be changed based on the above difference.

(Exemplary Variation of Physical Information)

While in the above-described embodiment, control computer 100 uses physical information indicating a variation of a posture with time to determine whether an amount of controlling a drive unit should be changed, and determine the amount, this is not exclusive and another type of physical information may be combined together. For example, a wearable sensor may be used to sense a movement of an eye of worker 10 and a variation with time of the amount of the movement of the eye as sensed (the direction of the movement, the distance of the movement, etc.) may be obtained by obtaining unit 103 or a variation with time of biological information (e.g., bodily temperature, etc.) of worker 10 as sensed by the sensor may be obtained by obtaining unit 103 and processed in combination with a variation with time of a posture as described above. The biological information is not limited to bodily temperature, and may be an amount of perspiration, a heart rate, a blood pressure, etc., insofar as it is information generated by a living body.

(Exemplary Variation of Load Estimation Unit 108)

While in the above embodiment, load estimation unit 108 uses one type of threshold value TH for determination, it may use a plurality of types of threshold values for determination. For example, the threshold value includes two types of threshold values TH1 and TH2, where TH1>TH2, and when load estimation unit 108 determines that the difference is larger than threshold value TH1, amount-of-control determination unit 105 determines an amount of controlling the drive unit to rapidly reduce the difference. Similarly, when load estimation unit 108 determines that threshold value TH1>the difference>threshold value TH2, amount-of-control determination unit 105 determines an amount of controlling the drive unit to slowly reduce the difference. When it is determined that the difference is smaller than threshold value TH2, the amount of controlling the drive unit is maintained (i.e., is not changed).

(Exemplary Variation of "Learning Mode")

While in the "learning mode" of the above embodiment, to obtain physical information 107 at work in a stable condition, the "learning mode" is entered when worker 10 is in a good physical condition, when the mode is entered is not limited as such. For example, the "learning mode" is repeated for a relatively long period of time (for example for three days or longer). In that case, a plurality of patterns can be detected in which the level (or position) of the waist of a worker indicated by physical information 107 of the worker at work converges to a fixed range. Of these patterns, a most frequently observed pattern may be determined as physical information 107 of the worker at work in a stable operation.

(Process by Management Computer 300)

In each embodiment, when an amount of controlling the drive unit is changed (step S25) frequently, (i.e., N times within a predetermined period of time), control computer 100 may send notification to management computer 300. In that case, the manager can check a condition of the production line or worker 10 based on the notification.

Furthermore, together with the notification, control computer 100 may be adapted to transmit physical information 107 of worker 10 or his/her bodily temperature etc. to management computer 300. Thus when an amount of controlling the drive unit is changed frequently, the manager can estimate a cause thereof from physical information 107 of worker 10 or his/her bodily temperature.

(Other Method of Changing Amount of Controlling Drive Unit)

While in the above embodiment, an amount of controlling the drive unit is changed based on the difference described above, the amount may be changed based on the difference and productivity. Herein, the productivity is represented by the number of workpieces W transported per unit time, although this is not exclusive. A threshold value for this productivity is determined for each worker 10 through an experiment or the like. Specifically, when the difference is less than or equal to threshold value TH, and the productivity indicated by the number of workpieces W transported per unit time as described above is less than or equal to the threshold value therefor, it is estimated that worker 10 affords more work under a normal load (for example, robot 60 operates too slowly in transporting the workpiece). In that case, even if the difference is less than or equal to threshold value TH, the amount of controlling drive unit 62 may be changed to operate drive unit 62 faster.

Second Embodiment

A second embodiment provides a program for causing CPU 110 of control computer 100 to execute at least one of the above-described "learning mode" and "operational mode." Such a program can be recorded in a flexible disk that is an accessory of control computer 100, a CD-ROM (Compact Disk-Read Only Memory), a ROM, a RAM, memory card 123 or a similar, computer readable recording medium and thus provided as a program product. Alternatively, the program can also be stored in a storage medium such as hard disk 114 incorporated in control computer 100, and thus provided. Furthermore, the program can also be provided by downloading it from a network (not shown) via communication interface 124.

Note that the program may invoke a required module of program modules provided as a portion of an operating system (OS) of control computer 100, in a prescribed sequence, as timed as prescribed, and may cause the module to perform a process. In that case, the program per se does not include the above module and cooperates with the OS to perform the process. Such a program that does not include the module can also be included in the program according to the second embodiment.

Furthermore, the program according to the second embodiment may be incorporated in and provided as a portion of another program. The program in that case also per se does not include a module included in the other program and cooperates with the other program to perform a process. Such a program incorporated in another program can also be included in the program according to the second embodiment.

The provided program product is installed in a program storing unit, such as a hard disk, and executed. Note that the program product includes a program per se and a recording medium having the program recorded therein.

Configuration of Embodiment

In FIG. 1, control computer 100 controlling drive unit 62 composed by a production line comprises: obtaining unit 103 that obtains physical information 107 indicating a variation with time of a posture of worker 10 at work; information retention memory 102 for storing physical information 107 of worker 10 obtained when the worker works in a stable posture; a difference detection unit 104 that detects a difference between a magnitude of a variation with time that is indicated by physical information 107 obtained and a magnitude of a variation with time that is indicated by physical information 107 stored in information retention memory 102; and amount-of-control determination unit 105 that determines from the detected difference whether to change an amount of controlling drive unit 62.

The difference from physical information 107 obtained when the worker works in the stable posture can vary with a working load on the worker. The drive unit of the production line can thus be controlled depending on the load on the worker.

Preferably, physical information 107 includes information of worker 10 indicating a variation with time of an amount of movement of worker 10 at work (see FIGS. 4 and 5). Thus a variation with time of an amount of movement can be used as physical information 107.

Preferably, amount-of-control determination unit 105 includes load estimation unit 108 that determines from the difference a degree of a load on worker 10, and, from a result of the determination, determines whether to change the amount of controlling the drive unit. The degree of the load can thus be determined from the above described difference.

Preferably, difference detection unit 104 detects a difference between a feature value (such as an average) of physical information 107 obtained by obtaining unit 103 and a feature value of physical information 107 stored in information retention memory 102. Thus the above difference can also be obtained from the feature value.

Preferably, physical information 107 further includes biological information of worker 10 at least including bodily temperature. Thus the biological information of worker 10 can also be used to determine whether to change the amount of controlling the drive unit.

Preferably, control computer 100 further comprises learning unit 101 that stores to information retention memory 102 physical information 107 of worker 10 obtained when the worker works in a stable posture. This allows a single control device to have a function of determining whether to change an amount of controlling the drive unit and a function of accumulating physical information 107 in information retention memory 102.

Advantages of Embodiment

According to the above embodiment a difference is compared with threshold value TH to determine whether the worker is overloaded (or a magnitude (or degree) of a load on the worker) and accordingly determine whether to change the amount of controlling the drive unit. When the amount is to be changed, it is changed based on the difference. Thus an amount of an operation of robot 60 (more specifically, an amount by which arm 63 pivots) is changed via drive unit 62 in accordance with an amount of controlling drive unit 62 in accordance with a degree of a load on worker 10. This allows worker 10 and robot 60 on a production line to cooperatively work more productively. Furthermore, a situation can be avoided in which worker 10 is overloaded.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

1: system; 10: worker; 50: sensor; 60: robot; 61: controller; 62: drive unit; 63: arm; 100: control computer; 101: learning unit; 102: information retention memory; 103: obtaining unit; 104: difference detection unit; 105: amount-of-control determination unit; 106: command signal; 107: physical information; 108: load estimation unit; 200: unit; 300: management computer; W: workpiece.

The invention claimed is:

1. A control device configured to control a drive unit comprised in a production line, the control device comprising:
   an obtaining unit that obtains, while a worker performs repeated work operations in cooperation with a robot driven by the drive unit, physical information of a worker indicating a variation with time of a posture of the worker at work;
   a storage for storing physical information of the worker obtained when the worker works in a stable posture;
   a detection unit that, when a respective work operation of the repeated work operations performed by the worker in cooperation with the robot is complete, detects a difference between a magnitude of the variation with time indicated by the physical information obtained and a magnitude of a variation with time indicated by the physical information stored in the storage; and
   a determination unit that determines from the detected difference, whether to change an amount of controlling the drive unit driving the robot for a respective next work operation to be performed by the worker in cooperation with the robot.

2. The control device according to claim 1, wherein the physical information includes information of the worker indicating a variation with time of an amount of movement of the worker at work.

3. The control device according to claim 1, wherein the determination unit includes an estimation unit that determines from the difference a degree of a load on the worker, and, from a result of a determination made by the estimation unit, determines whether to change the amount of controlling the drive unit.

4. The control device according to claim 1, wherein when the obtaining unit has obtained the physical information, the detection unit detects a difference between a feature value of the obtained physical information and a feature value of the physical information stored in the storage.

5. The control device according to claim 1, wherein the physical information further includes biological information of the worker at least including bodily temperature.

6. The control device according to claim 1, further comprising an accumulation unit that accumulates in the storage the physical information of the worker obtained when the worker works in the stable posture.

7. A system comprising:
a drive unit comprised in a production line;
a sensor comprised by the production line and sensing a posture of a worker at work; and
a control device that controls the drive unit, the control device including
an obtaining unit that obtains, while a worker performs repeated work operations in cooperation with a robot driven by the drive unit, physical information from the sensor indicating a variation with time of the posture,
a storage for storing physical information of the worker obtained when the worker works in a stable posture,
a detection unit that, when a respective work operation of the repeated work operations performed by the worker in cooperation with the robot is complete, detects a difference between a magnitude of the variation with time indicated by the physical information obtained and a magnitude of a variation with time indicated by the physical information stored in the storage, and
a determination unit that determines from the detected difference whether to change an amount of controlling the drive unit driving the robot for a respective next work operation to be performed by the worker in cooperation with the robot.

8. A method of controlling a drive unit comprised by a production line, with a computer including a storage for storing physical information of a worker indicating a variation with time of a posture of the worker at work in a stable posture, the method comprising:
obtaining, while a worker performs repeated work operations in cooperation with a robot driven by the drive unit, physical information of the worker indicating a variation with time of a posture of the worker at work;
detecting, when a respective work operation of the repeated work operations performed by the worker in cooperation with the robot is complete, a difference between a magnitude of the variation with time indicated by the physical information obtained and a magnitude of a variation with time of a posture of the worker indicated by physical information of the worker obtained when the worker works in a stable posture; and
determining from the detected difference whether to change an amount of controlling the drive unit driving the robot for a respective next work operation to be performed by the worker in cooperation with the robot.

9. A non-transitory computer-readable medium storing program for causing a computer to perform a method for controlling a drive unit comprised in a production line, the computer including a storage for storing physical information of a worker indicating a variation with time of a posture of the worker at work in a stable posture, the method comprising:
obtaining, while a worker performs repeated work operations in cooperation with a robot driven by the drive unit, physical information of the worker indicating a variation with time of a posture of the worker at work;
detecting, when a respective work operation of the repeated work operations performed by the worker in cooperation with the robot is complete, a difference between a magnitude of the variation with time indicated by the physical information obtained and a magnitude of the variation with time indicated by the physical information stored in the storage; and
determining from the detected difference whether to change an amount of controlling the drive unit driving the robot for a respective next work operation to be performed by the worker in cooperation with the robot.

* * * * *